(12) United States Patent
Tsuru et al.

(10) Patent No.: US 7,524,001 B2
(45) Date of Patent: Apr. 28, 2009

(54) RUBBER CRAWLER

(75) Inventors: Eiji Tsuru, Yokohama (JP); Shinji Uchida, Yokohama (JP)

(73) Assignee: Bridgestone Corporation, Toyko (JP)

( * ) Notice: Subject to any disclaimer, the term of this patent is extended or adjusted under 35 U.S.C. 154(b) by 169 days.

(21) Appl. No.: 10/535,415

(22) PCT Filed: Nov. 20, 2003

(86) PCT No.: PCT/JP03/14833

§ 371 (c)(1),
(2), (4) Date: May 19, 2005

(87) PCT Pub. No.: WO2004/045938

PCT Pub. Date: Jun. 3, 2004

(65) Prior Publication Data

US 2006/0163944 A1    Jul. 27, 2006

(30) Foreign Application Priority Data

| Nov. 20, 2002 | (JP) | ............................. 2002-337022 |
| Dec. 12, 2002 | (JP) | ............................. 2002-361254 |
| Dec. 12, 2002 | (JP) | ............................. 2002-361255 |
| Dec. 12, 2002 | (JP) | ............................. 2002-361257 |
| Dec. 12, 2002 | (JP) | ............................. 2002-361258 |
| Dec. 12, 2002 | (JP) | ............................. 2002-361259 |
| Dec. 12, 2002 | (JP) | ............................. 2002-361260 |
| Dec. 13, 2002 | (JP) | ............................. 2002-361758 |
| May 14, 2003  | (JP) | ............................. 2003-136457 |

(51) Int. Cl.
*B62D 55/24* (2006.01)

(52) U.S. Cl. ..................... 305/171; 305/177

(58) Field of Classification Search ......... 305/157–158, 305/165, 167, 169, 171, 173–177
See application file for complete search history.

(56) References Cited

U.S. PATENT DOCUMENTS

| 5,522,655   | A  * | 6/1996  | Katoh    | 305/174 |
| 6,588,862   | B1 * | 7/2003  | Pringiers | 305/167 |
| 6,652,044   | B1 * | 11/2003 | Katoh et al. | 305/165 |
| 2005/0218722 | A1 * | 10/2005 | Kurokawa | 305/171 |

FOREIGN PATENT DOCUMENTS

| EP | 1 013 542 A1 | 6/2000 |
| JP | 7-61382 A    | 3/1995 |
| JP | 2000-313371 A | 11/2000 |

* cited by examiner

*Primary Examiner*—Jason R Bellinger
(74) *Attorney, Agent, or Firm*—Sughrue Mion, PLLC

(57) ABSTRACT

A rubber crawler has a structure in which connecting members are sequentially fitted onto wing portions adjacent to each other without using steel cords for resisting tensile force applied to the rubber crawler. Accordingly, the rubber crawler of the present invention has excellent characteristics in that breakage of steel cords due to the tensile force can be prevented, and torsion of the rubber crawler can be reduced.

18 Claims, 24 Drawing Sheets

RUBBER CRAWLER

BACKGROUND OF THE INVENTION

1. Field of the Invention

The present invention relates to a rubber crawler mainly used for construction machines or civil engineering machines. More particularly, the present invention relates to a rubber crawler adopting a brand new structure as a tensile reinforcing member.

2. Background Technology

Conventionally, steel cords are embedded in a rubber crawler in a longitudinal direction of the rubber crawler to operate as tensile reinforcing members resisting tensile force applied thereto. However, in ordinary methods, when steel cords are formed in an endless manner, overlapped portions are formed between the steel cords. Due to this, there have been drawbacks in that a crawler operator can sense vibrations, and use of very high speed is impossible. Another the drawback has also been pointed out that steel cords, which are used as a tensile reinforcing member of a conventional rubber crawler, is easily broken when excessive tensile force is applied thereto.

Japanese Patent Application (JP-A) Laid-open No. 2000-313371 discloses a rubber crawler having a structure in which steel cords are not used. However, since in the rubber crawler in this disclosure all the core metals are of a type requiring assembly, problems are caused in that a lot of time and labor is necessary for manufacturing the rubber crawler and the rubber crawler does not exhibit excellent strength. Specifically, since considerably close attention must be paid especially when core metals and tensile reinforcing members are assembled, working efficiency is impaired. Further, since two bars are used at portions corresponding to wing portions of the core metals, comparatively fine materials should be used. For this reason, it can be predicted that problems such as deterioration of strength may occur. Moreover, since a connecting member for connecting these bars is structured to be comparatively easily elongated or the like, further improvements are required.

Accordingly, the present applicants are developing a rubber crawler having a brand new structure in which conventional steel cords are not used and instead, metallic connecting members are used as tensile reinforcing members such that the metallic connecting members are connected sequentially to wing portions of core metals adjacent to each other.

In the brand new rubber crawler, holes for sequential connection are formed in advance on wing portions of core metals, and connecting members having hooks at both sides thereof corresponding with the holes are used. The hooks are engaged with the corresponding holes. Accordingly, all the core metals are connected to one another in an endless manner, and then embedded in rubber. A rubber crawler is thus formed. In this rubber crawler, since the rubber crawler can be formed endlessly without using steel cords as a tensile reinforcing member, vibration or the like is improved, and high tensile strength is exhibited. However, in actuality, further improvements are required.

In the present invention, a rubber crawler is further improved such that a core metal has a simpler structure and an engaging member has a stronger structure.

SUMMARY OF THE INVENTION

The summary of the invention is a rubber crawler comprising an endless rubber elastomer, core metals each including protruding portions protruding from an inner circumference of the rubber elastomer and a pair of left-hand side and right-hand side wing portions embedded in the rubber elastomer, and lugs formed at an outer circumference of the rubber elastomer, wherein two connecting members are fitted onto each of the left-hand side and right-hand side wing portions of each core metal in the longitudinal direction of the rubber elastomer, such that the adjacent core metals are sequentially connected with each other.

The present invention is structured as described above. Steel cords, which are usually embedded as a tensile reinforcing member in a rubber elastomer in the longitudinal direction the0reof, are not embedded. Instead, wing portions of core metals are connected to one another by using connecting members as a tensile reinforcing member. Further, two pairs of connecting members are fitted onto each pair of left-hand side and right-hand-side wing portions at both ends of each core metal. The connecting members can exhibit higher strength than the conventional steel cords and excellent constraint force in resisting torsion of core metals. Specifically, connecting members to which a tensile force is applied and wing portions of core metals to which driving force from sprockets is applied are embedded in a rubber elastomer so as to be flush with each other. Consequently, removal of core metals from a rubber elastomer can be prevented.

Concerning the core metal, it is preferable that a portion of each of the left-hand side and right-hand-side wing portions onto which a connecting member is fitted is formed into a substantially circular cross-sectional configuration for facilitating a rotation of the connecting member therearound. Further, a side of the wing portion which is not in contact with the connecting member can be formed into a trapezoidal shaped cross-sectional configuration, in order to effectively prevent a swinging rotation of core metals. That is, the cross section of the wing portion at the side in contact with the connecting member is formed into a substantially circular-shaped configuration, and that of the wing portion at the other side not in contact with the connecting member is formed into a trapezoidal-shaped configuration. Accordingly, when the rubber crawler is wound around an idler or a sprocket, a rotational movement of the connecting member is not disturbed. Further, when a relative rotational force between core metals and connecting members is large, or when a swinging rotational force in a direction opposite to the relative rotational force occurs, the inclining surfaces of the trapezoidal shape side that are not usually in contact with the connecting members, are brought into contact with the connecting members to block further rotation between core metals and connecting members. The inclining angle θ of an inclining surface of the trapezoidal shape of the wing portions ranges from 5° to 30°.

It is preferable that a tip end portion of the wing portion to be fitted into the connecting member is a protruding portion whose cross-sectional configuration is different from that of the remaining portion in order to prevent the removal of the connecting member from the wing portion during the assembly of the rubber crawler or after the rubber crawler has been completed. For this reason, for example, the tip end portion of the wing portion forms a protruding portion that extends in the longitudinal direction or the thickness direction of the rubber elastomer.

Expanded portions can be provided at the outer side of each protruding portion of each core metal so as to extend along the longitudinal direction of the rubber elastomer. Such expanded portions are expanded on at least one side in the longitudinal direction of the rubber elastomer, and are generally formed in a flat shape. Since the expanded portions are partially or entirely embedded in the rubber elastomer, the wing portion having the substantially circular or wing-shaped cross-sectional configuration can be prevented from being easily rotated in the rubber elastomer. The expanded portions can be formed either at immediate outer sides of the protruding portions, at the midpoints of the wing portions toward the connecting members, or at the tip end portions of the wing portions. When flat expanded portions are formed immediately at both outer sides of the protruding portions, the expanded portions are exposed (protruded) from the rubber elastomer and used as rail portions during wheel running. The aforementioned structural features of the core metals are shaped by the core metals of other aspects of the present invention described below.

It is most preferable that the connecting member is formed by a metal. However, from the standpoints of the dimensions of a rubber crawler or a relationship between the connecting member and a tensile force, a plastic product can be used. Engaging portions, each having a substantially circular cross-sectional configuration, are formed at both ends of the connecting member, whereby the engaging portions are sequentially engaged with the wing portions of the core metals. Then, two pairs of connecting members are used for each pair of the left-hand side and right-hand side wing portions of the core metal, to disperse the tensile force and resist torsion of the core metals. The engaging portions are structured such that they are inwardly open at one side, or inwardly open at the other side, or closed endlessly in the longitudinal direction of the rubber elastomer, or the like. Among these, an engaging portion having the closed and endless structure is the strongest. Further, a flat portion may be formed at one side of the connecting member and embedded in the rubber elastomer so as to face wheels, and then exposed from the rubber elastomer surface, to form rail portions on which wheels travel. Connecting members can be formed into other configurations as will be described later with reference to the drawings. A variety of arrangements of the connecting members can be considered, and examples thereof include a symmetric arrangement, a non-symmetric arrangement, a staggered arrangement, an arrangement using a second connecting member, or an arrangement in combination thereof.

The invention using a second connecting member is a rubber crawler comprising an endless rubber elastomer, core metals including protruding portions protruding from an inner circumference of the rubber elastomer and pairs of left-hand side and right-hand side wing portions embedded in the rubber elastomer on either side thereof, and lugs formed at an outer circumference of the rubber elastomer, wherein fitting holes are formed at both ends of each of the wing portions, and tip end portions of a second connecting member which is bent into a substantially U shape are fitted into the fitting holes of the wing portions of each of the core metals adjacent to each other, such that all the core metals are sequentially connected to one another.

Further, while there is a case in which wheels travel on inner circumferential surfaces of the rubber crawler, there is also a case in which rails are provided at the wing portions at both outer sides of the protruding portions of the core metals. Alternately, the cross-sectional configuration of a wing portion of a core metal can be changed or a protruding portion can be formed in order to prevent removal of the connecting member from the wing portion. Any structure for a core metal can be adopted.

The wing portions of the core metals need not be one single piece and can be branched like a stonometer to form a fork shape, and the connecting members can be fitted onto the branch portions of the fork shapes. In this case, the wing portions becomes flat as a whole, and unwanted rotation or swinging rotation of the wing portions during running of wheels can be prevented. More specifically, the wing portions are branched into a two-forked portion or a three-forked portion onto which end portions of a connecting portion can be fitted.

The present invention can provide a rubber crawler having the above-described structure, in which steel cords which have been conventionally used is rendered unnecessary, which can exhibit excellent strength as compared to that in a conventional rubber crawler. Further, the assembly of the rubber crawler can be simplified and secured, and since the wing portions of the core metals and the connecting members are embedded in the rubber elastomer to be flush with each other, the phenomenon of torsion and the occurrence of removal of the core metals from the rubber elastomer or the like can be reduced.

EMBODIMENTS

Hereinafter, with reference to the drawings, embodiments of the present invention will be explained in more detail.

Figure 1:
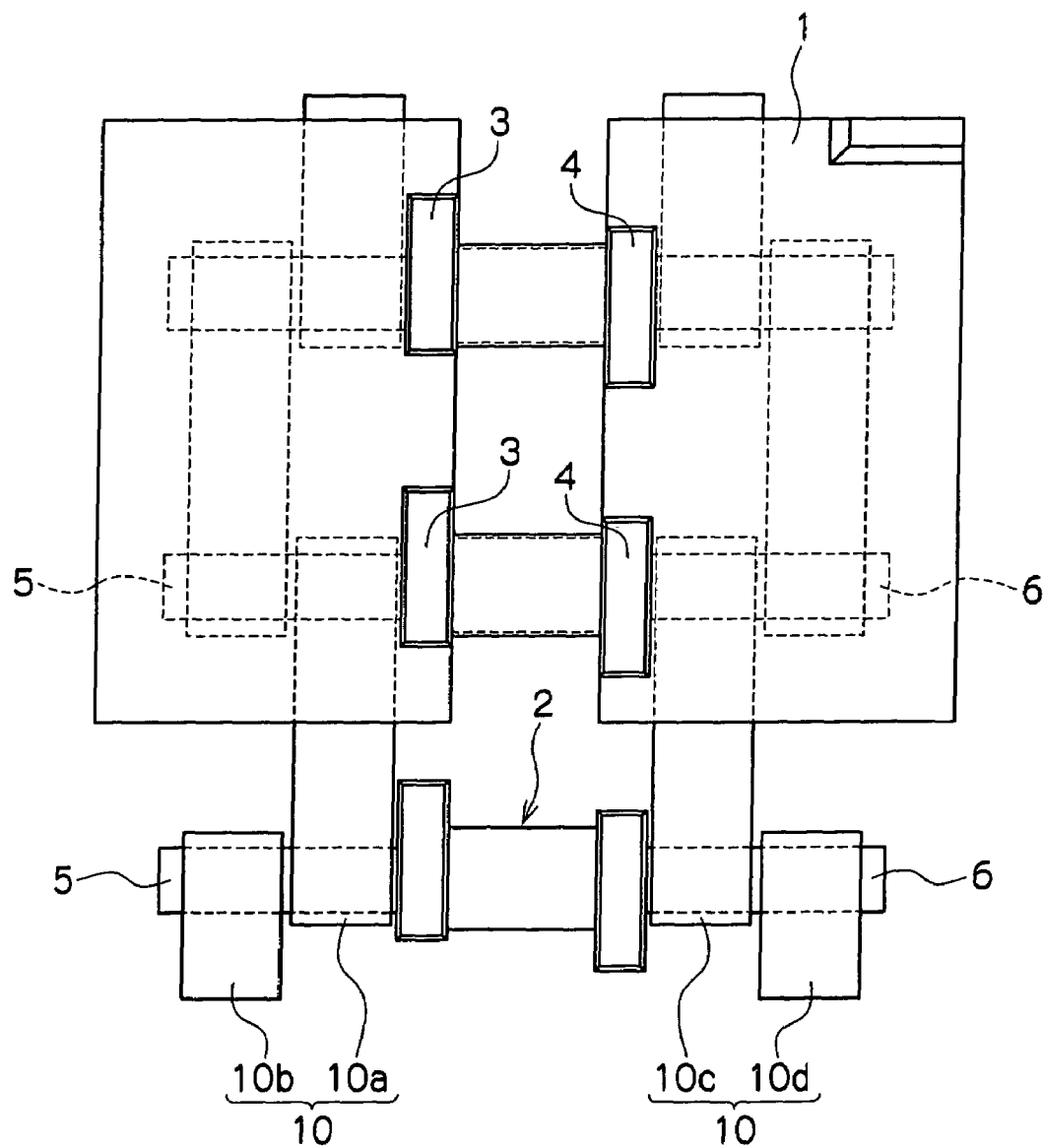
FIG. 1 is a plan view of an inner circumferential surface side of a rubber crawler of a first example according to one embodiment of the present invention.
Figure 2:
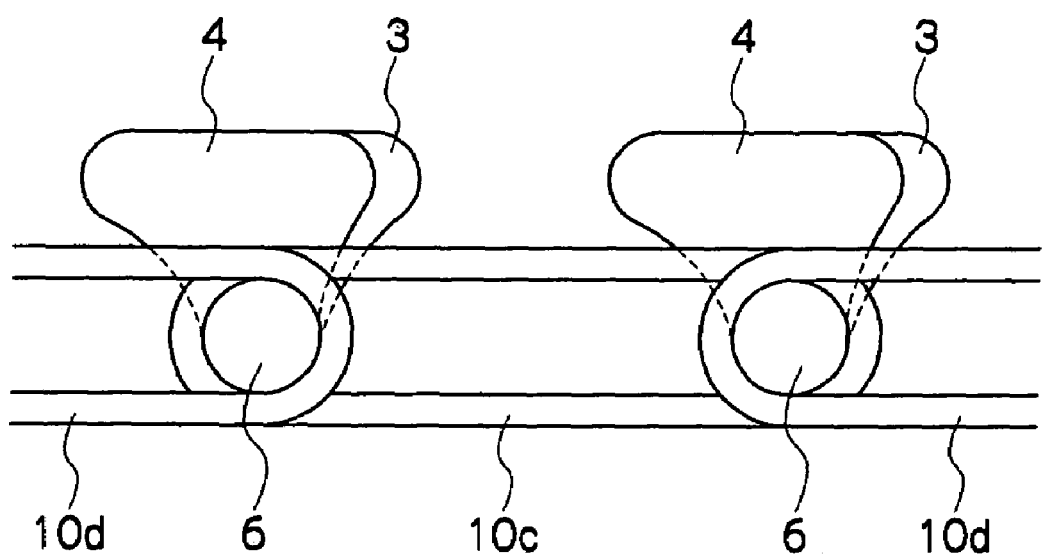
FIG. 2 is a side view of FIG. 1.
Figure 3:
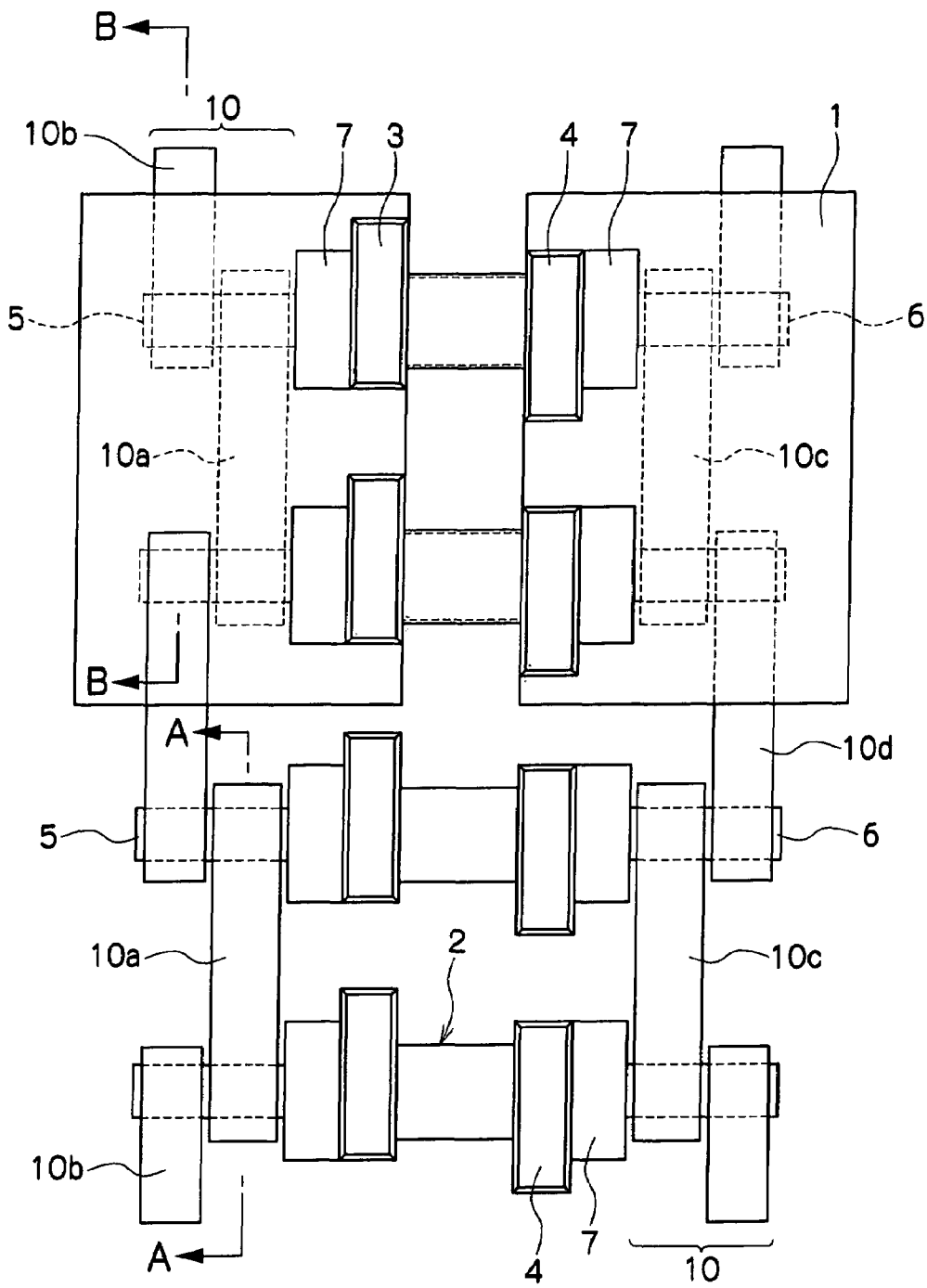
FIG. 3 is a plan view of an inner circumferential surface side of a rubber crawler according to another embodiment of the present invention.
Figure 4:
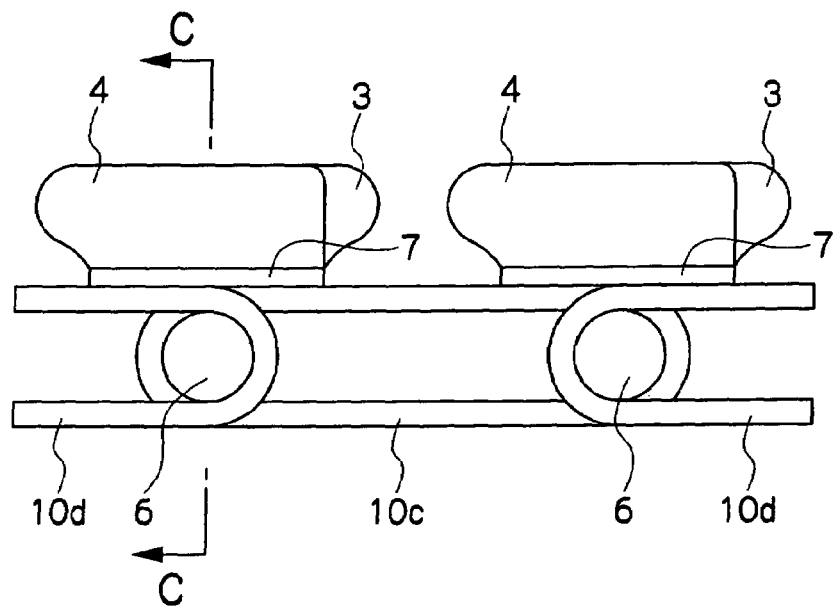
FIG. 4 is a side view of FIG. 3.
Figure 5:
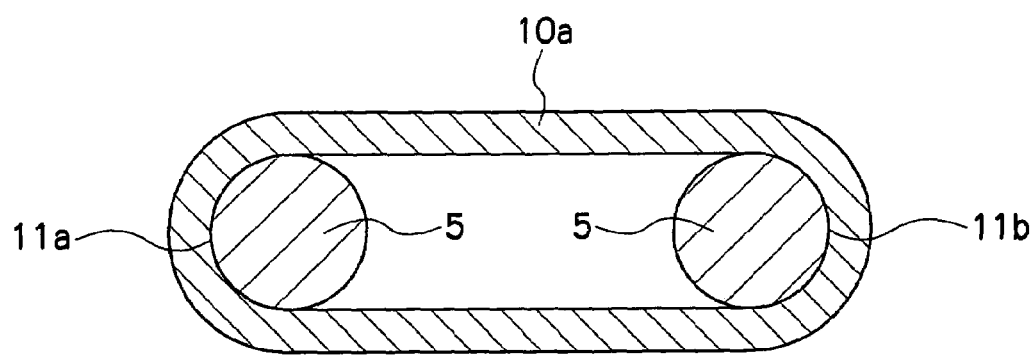
FIG. 5 is a cross-sectional view taken along a line A-A.
Figure 6:
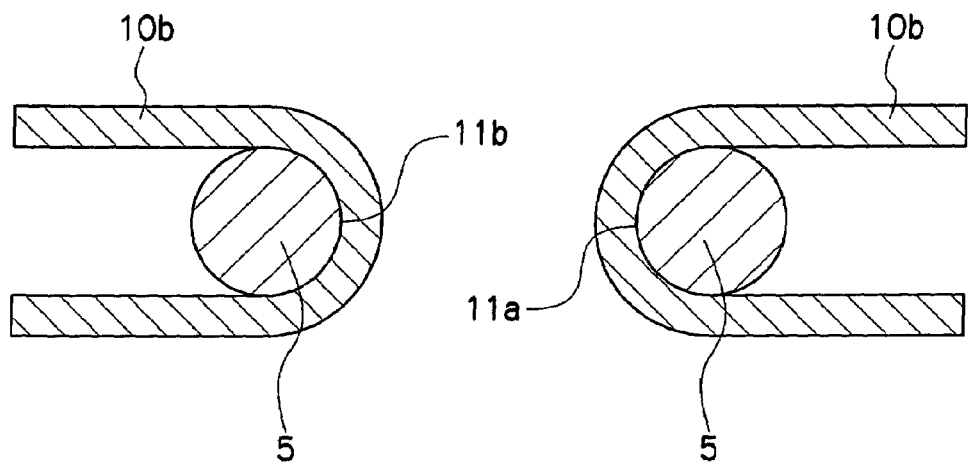
FIG. 6 is a cross-sectional view taken along a line B-B.
Figure 7:
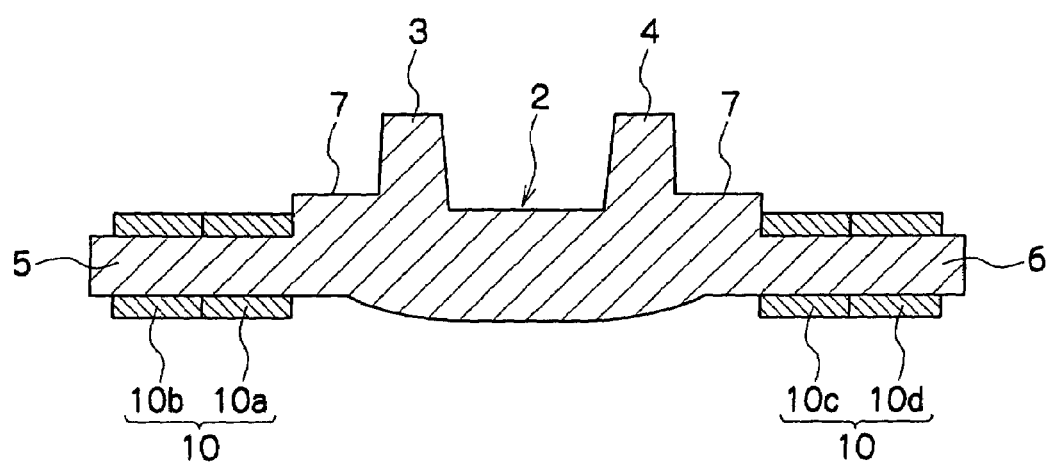
FIG. 7 is a cross-sectional view taken along a line C-C.

FIG. 1 is a plan view illustrating an inner circumferential surface side of a rubber crawler of a first example according to one embodiment of the present invention, and FIG. 2 is a side view thereof. FIG. 3 is an inner circumferential side plan view illustrating a rubber crawler of a second example according to the one embodiment of the present invention, and FIG. 4 is a side view thereof. FIG. 5 is a cross-sectional view taken along a line A-A, FIG. 6 is a cross-sectional view taken along a line B-B, and FIG. 7 is a cross-sectional view taken along a line C-C.

In these figures, the reference numeral 1 refers to a rubber elastomer that is a base body constituting a rubber crawler. In FIGS. 1 and 3, the rubber elastomer 1 is connected endlessly in the top-bottom direction of the respective paper surfaces of the drawings. The reference numeral 2 refers to a core metal. The core metal 2 comprises a pair of protruding portions 3 and 4 that are formed so as to protrude from an inner circumferential surface of the rubber elastomer 1, and wing portions 5 and 6 that are formed at a left-hand side and at a right-hand side of the core metal 2. The wing portions 5 and 6, each of which is formed with a substantially circular cross-sectional shape, are embedded in the rubber elastomer 1. Further, in the example of FIG. 3, expanded portions (flat portions) 7 and 7 are formed respectively on the outer side of the pair of the protruding portions 3 and 4. The flat portions 7 and 7 comprise exposed portions that are exposed on the inner circumferential surface of the rubber elastomer 1 and embedded portions that are embedded in the rubber elastomer 1, and prevent the core metal 2 from swinging in the longitudinal direction or in the transverse direction of the core metal 2. The surfaces of the flat portions 7 and 7 are rail portions on which wheels travel.

Connecting members 10 in two rows (10a, 10b and 10c, 10d) are fittingly arranged in a staggered form in the longitudinal direction onto the wing portions 5 and 6 of the core metals 2 adjacent to one another, whereby all the core metals 2 are connected to one another. FIG. 1 shows a symmetric arrangement of the connecting members 10. Specifically, the connecting members (10a, 10b) are fitted onto the wing portions 5 in a staggered form in the longitudinal direction, whereby the core metals 2 are connected to one another. Similarly to the connecting members (10a, 10b), the connecting members (10c, 10d) are also fitted onto the wing portions 6. Accordingly, the wing portions 5 and 6 on the left and the right are connected to one another to form a symmetric arrangement. Of course, while not shown, the connecting portions 10 can form an asymmetric arrangement on the left and the right.

When the rubber crawler is entrained around an idler or a sprocket, since the connecting members are formed to have rigid bodies, deformation of portions with the connecting members embedded therein is comparatively low, while deformation of portions without the connecting members embedded therein is unavoidably high. Such difference in deformation is especially conspicous between the connecting members and a portion of the rubber elastomer which completely lacks the connection member in the transverse direction thereof. Consequently, torsion due to repetitive tensile and compressive deformation is focused on the portion of the rubber elastomer which completely lacks the connection member in the transverse direction thereof.

Figure 8:
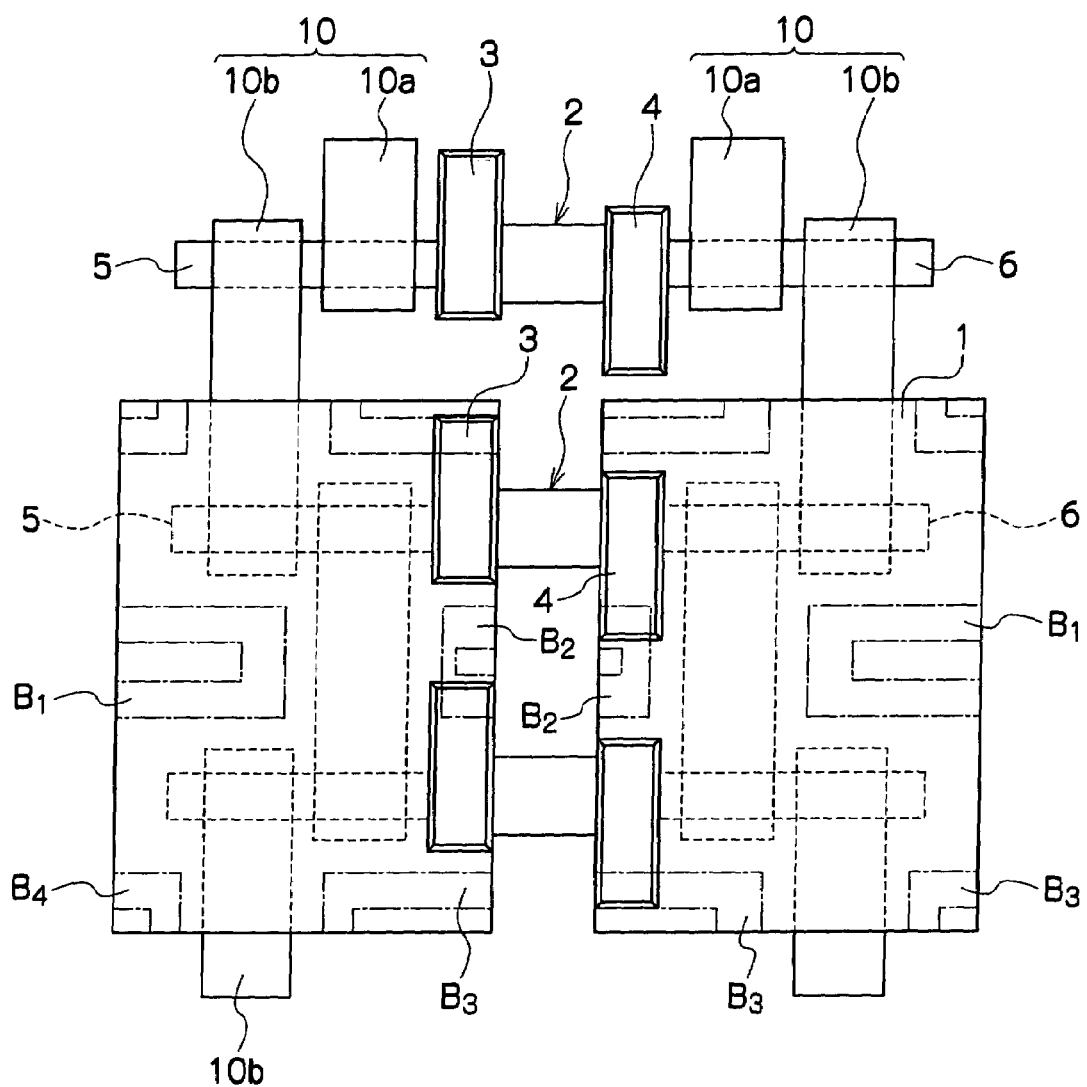
FIG. 8 is a plan view of an inner circumferential surface side of a rubber crawler in which recesses are formed at predetermined positions.

As shown in FIG. 8, for example, recesses B1 through B4 may be formed at an inner circumferential side and/or at an outer circumferential side of the rubber elastomer 1 at the portions of the rubber elastomer which completely lack the connection members in the transverse direction thereof. Accordingly, the focusing of torsion due to repetitive tensile and compressive deformation on a particular portions can be prevented thus making it possible to prevent deterioration of the rubber elastomer 1 and increase the durability of the rubber crawler.

Figure 9:
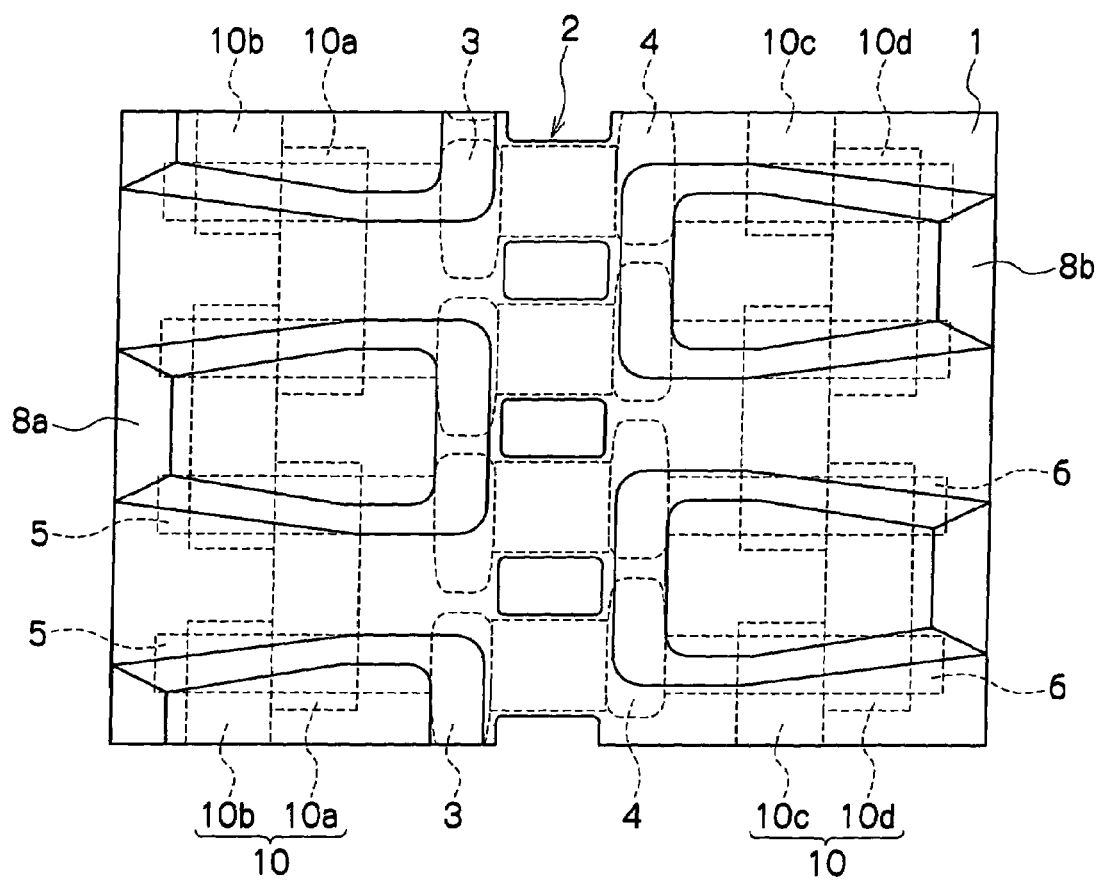
FIG. 9 is a plan view of a first example of an outer circumferential side structure of a rubber crawler.

With regard to a rubber crawler, if the rubber crawler is distorted or it passes over protruding portions on the running surface, cracks or the like can be easily formed on the rubber elastomer 1 covering the connecting members 10b and 10d at both left and right edge sides of the rubber elastomer 1. In consideration of this problem, as shown in FIG. 9, in some cases it is necessary to form lugs 8a and 8b for covering the connecting members 10b and 10d. In this structure, the thickness of the rubber at the outer circumferential side of connecting members 10b and 10d is significantly large (this thick portion with lugs will be referred to a "thick rubber portion" hereinafter). When protrusions collide with the thick rubber portion, external force applied thereto is damped and absorbed by the rubber elastomer 1 (the lugs 8a and 8b), and the external force applied on the connecting members is significantly reduced. Consequently, occurrence of cracks on the rubber elastomer can be reduced thus making it possible to increase the durability of the rubber crawler.

Figure 10:
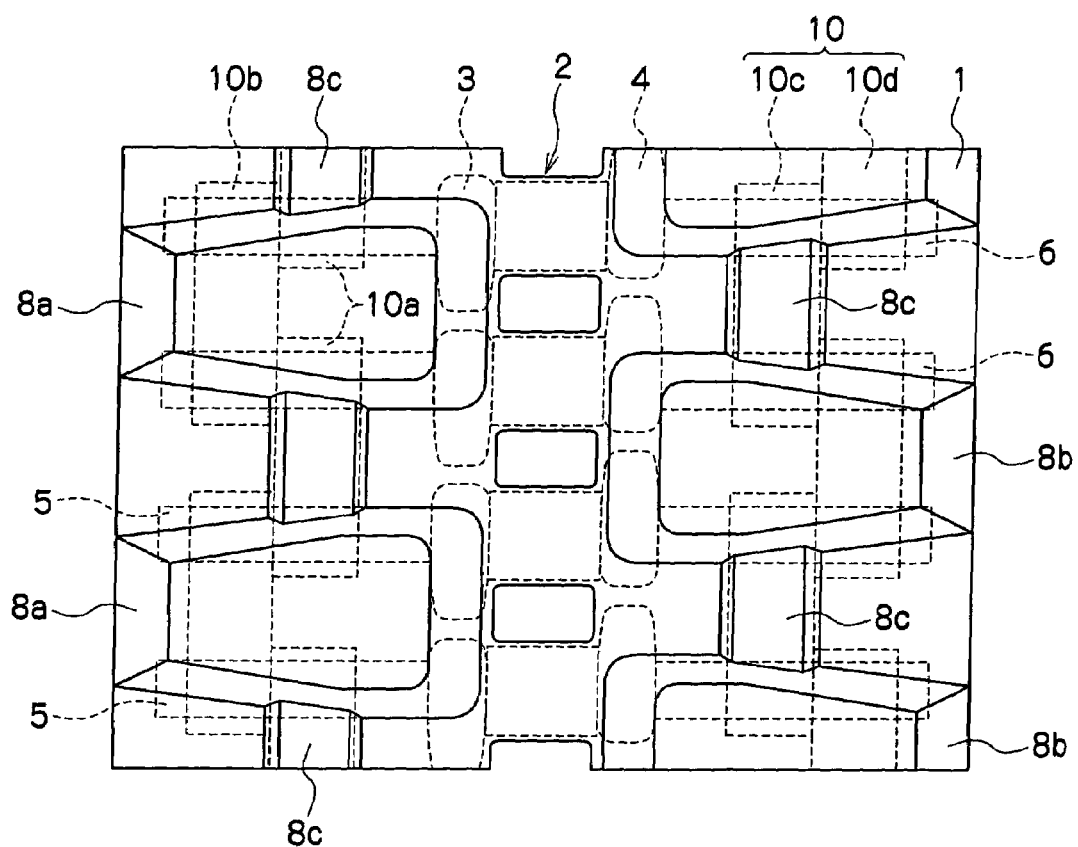
FIG. 10 is a plan view of a second example of an outer circumferential side structure of a rubber crawler.

FIG. 10 is a plan view of a modified example of FIG. 9. In this example, large thick portions 8c are formed at the outer circumferential surface of the connecting members 10a and 10c which are not covered with the lugs 8a and 8b in order to increase the durability of the rubber crawler 1. The thickness of the large thickness portion 8c can be appropriately chosen in accordance with the dimensions or the predetermined conditions of use for the rubber crawler 1.

Figure 11:
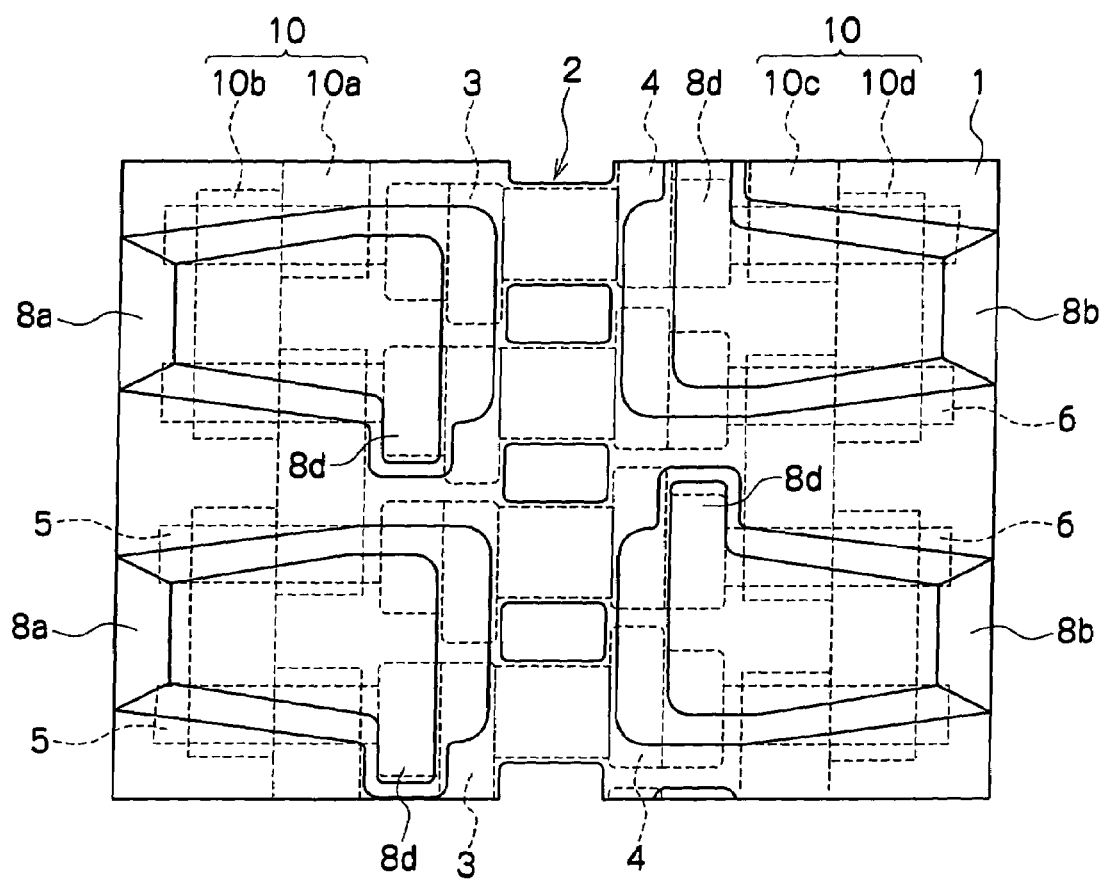
FIG. 11 is a plan view of a third example of an outer circumferential side structure of a rubber crawler.

As shown in FIG. 11, there is a case in which the connecting members (10a through 10d) are fitted onto the wing portions 5 and 6 of the core metals 2 in a symmetric arrangement around the central longitudinal axis. In this case, the aforementioned lugs 8a and 8b can be used unchanged. However, for example, protruding portions 8d can be provided directly beneath the running surface of unillustrated wheels in order to prevent vibrations.

Figure 12:
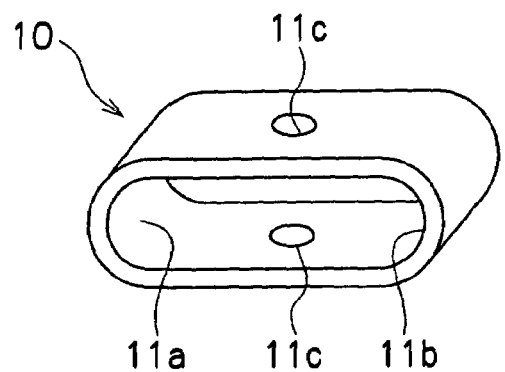
FIG. 12 is a perspective view of a first example of a connecting member.

FIG. 12 is a perspective view showing a first example of the connecting member 10 which is formed into a flat annular shape and in which engaging portions 11a and 11b, each having a substantially circular inner end, are formed at both ends thereof.

Figure 13:
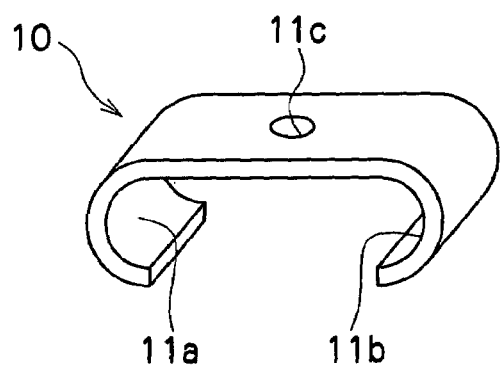
FIG. 13 is a perspective view of a second example of a connecting member.
Figure 14:
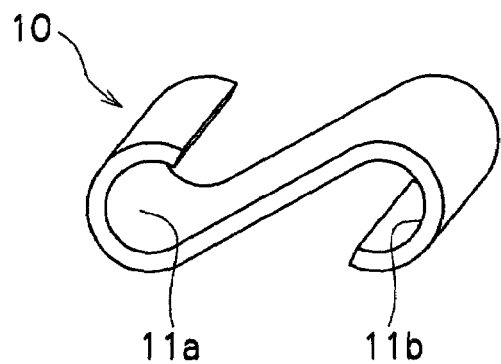
FIG. 14 is a perspective view of a third example of a connecting member.

FIG. 13 shows a second example of the connecting member 10 in which the engaging portions 11a and 11b are opened inwardly at one side. FIG. 14 shows a third example of the connecting member 10 in which the engaging portions 11a and 11b are opened inwardly in directions opposite to each other.

Figure 15:
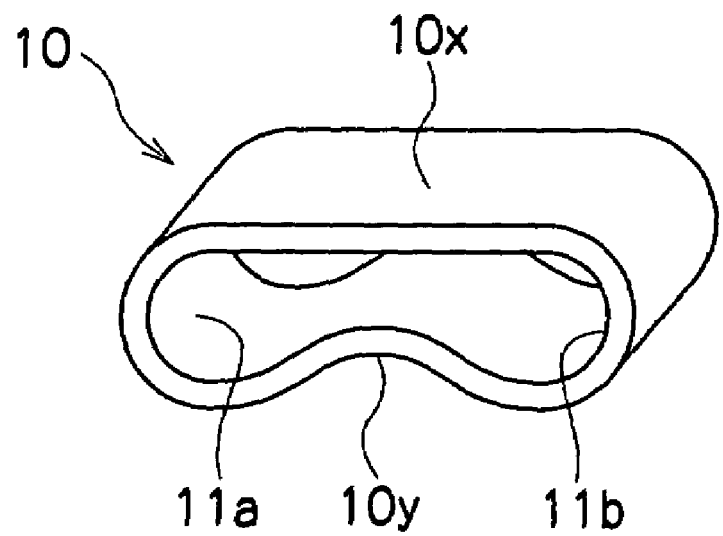
FIG. 15 is a perspective view of a fourth example of a connecting member.
Figure 16:
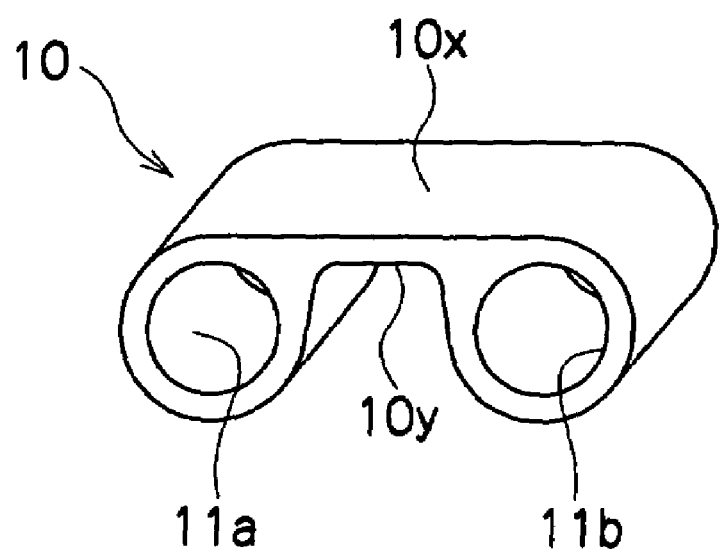
FIG. 16 is a perspective view of a fifth example of a connecting member.

FIG. 15 is a side view of a fourth example of the connecting member 10 in which one side portion of the connecting member 10 (generally, corresponding to the inner circumferential side portion of the rubber crawler) has a straight portion 10x, the other side portion (ordinarily, corresponding to the outer circumferential side portion of the rubber crawler) has a recess 10y at the center thereof, and the engaging portions 11a and 11b, each having a circular inner circumferential surface, are formed at both ends of the connecting member 10. FIG. 16 is a side view of a fifth example of the connecting member 10 which is formed in a substantially optical shape.

When the connecting members 10 as shown in FIGS. 15 and 16 are used for a rubber crawler, the recess 10y at the center thereof is filled with a rubber elastomer, and thus external force from the running surface during crawler running can be damped and absorbed by a rubber elastomer layer having increased volume, the force applied to the connecting members is decreased, and occurrence of cracks on the rubber elastomer can be reduced. As a result, the durability of the rubber crawler can be enhanced.

Figure 17:
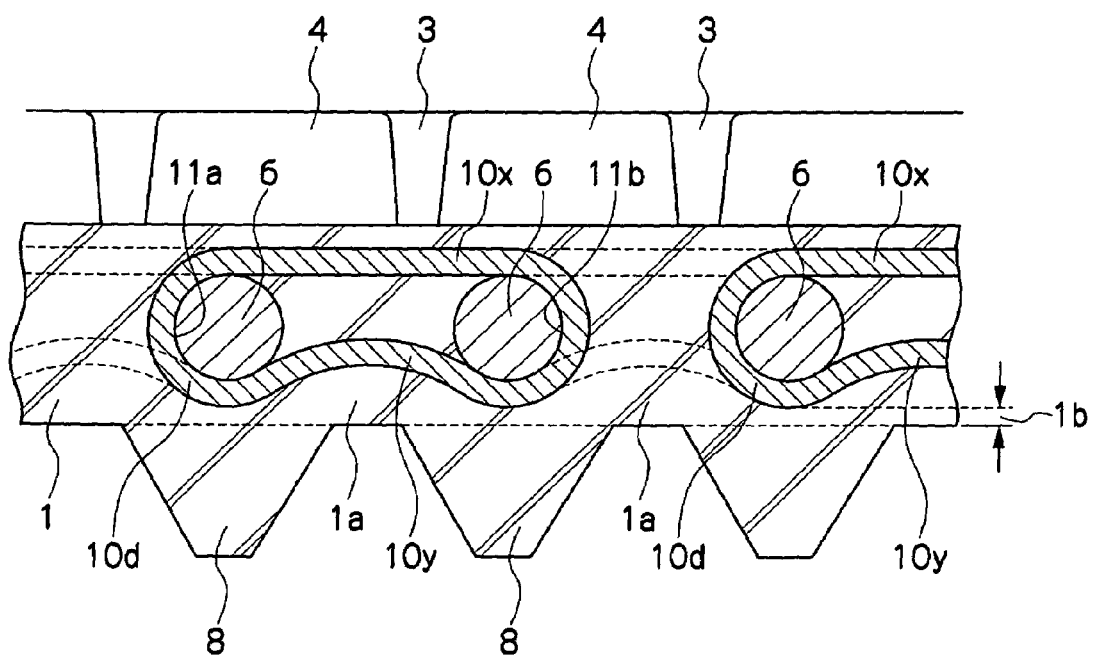
FIG. 17 is a cross-sectional view showing a relationship between connecting members of FIG. 15 and core metals.

FIG. 17 shows a cross-sectional view of a main portion of the rubber crawler when the connecting member 10 of FIG. 15 is used. The connecting member 10 is embedded in the rubber elastomer 1. The curvedly-recessed surface 10y is formed at the outer circumferencial surface side of the connecting member 10. The connecting member 10 at the outer circumferential surface side thereof is thus filled with a larger amount of the rubber elastomer 1 (larger by the amount of the recess 10y) than the case with the connecting member 10 without the recess 10y. In contrast, when the curvedly-recessed surface 10y is not formed at the connecting member 10 at the outer circumferential surface side of the rubber elastomer, the entire thickness of the rubber elastomer 1 is quite small (i.e., the rubber portion 1b). It can be assumed that damping effects will be deteriorated when the thin rubber portion (1b) collides with protrusions on the running surface when the rubber crawler is running, and cracks are easily formed on the rubber elastomer 1. However, in the structure shown in FIG. 17, since the curved-recessed surface 10y is provided at the connecting member 10 at the outer circumferential side thereof, the connecting member 10 at the outer circumferential surface side thereof is filled or covered with a larger amount (thick rubber portion 1a) of the rubber elastomer 1 (larger by the amount of the recess 10y) than the case with the connecting member 10 without the recess 10y. Accordingly, when protrusions on the running surface on which the crawler travels collide with the thick rubber portion 1a, external force applied thereto is well damped and absorbed by the rubber elastomer 1, and the external force applied to the connecting member 10 is significantly reduced. Consequently, the formation of cracks on the rubber elastomer 1 can be reduced thus making it possible to increase the durability of the rubber crawler.

A method for forming through holes in the connecting members 10 can be used for improving adhesiveness or attaching property thereof. In the example of FIG. 12, through holes 11c are formed on the connecting member 10. In this structure, a reliable adhesiveness can be obtained because rubber is introduced into the inner side of the connecting member 10 by way of the through holes 11c during the vulcanization. Of course, through holes 11c can be applied to the various types of connecting member 10.

Figure 18:
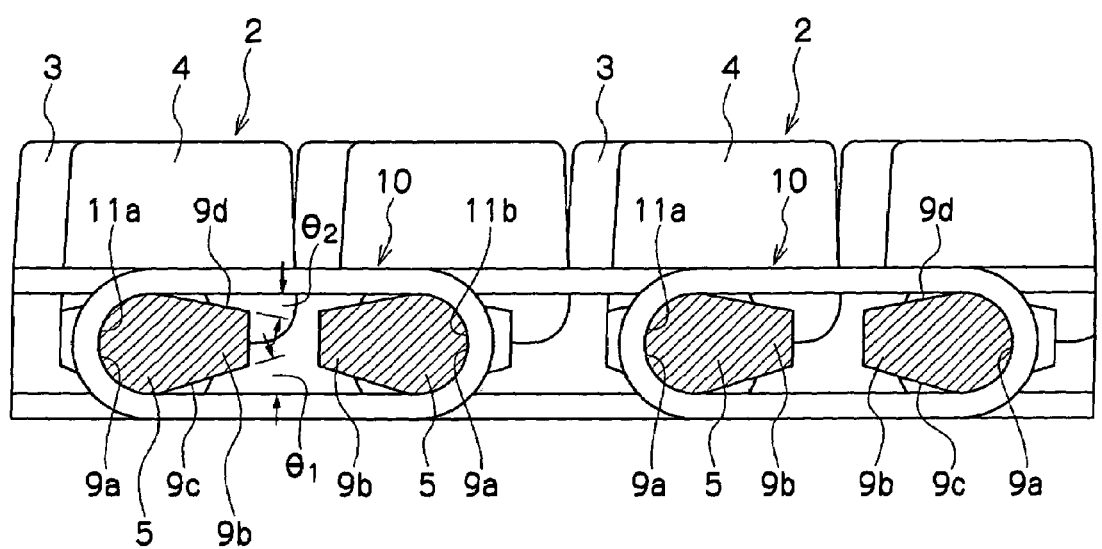
FIG. 18 is a plan view of a relationship between wing portions of another example, of a core metal, and connecting members.

Next, further examples of the wing portions 5 and 6 of the core metal 2 will be described. FIG. 18 shows a cross-sectional view similar to FIG. 5. In this example, the structure of the core metal 2 can be improved to prevent vibrating rotation of the core metal 2, improving riding comfort, preventing removal of wheels, and improving durability. Namely, the wing portion 5 at a surface that is contacted with the connecting member 10 is formed by a substantially circular shape 9a, while a surface thereof that is not contacted with the connecting member 10 is formed by a tapered trapezoidal shape 9b continuous with the circular shape 9a. The trapezoidal shape 9b has inclining surfaces 9c and 9d that are inclined at an outer circumferential side inclining angle $\theta 1$ and an inner circumferential side inclining angle $\theta 2$, respectively. The outer circumferential side inclining angle $\theta 1$ is set substantially equal to a maximum inclining angle formed when the rubber crawler is entrained around an idler or a sprocket. The inner circumferential side inclining angle $\theta 2$ is set as a tolerable play angle for allowing the swinging of the core metal 2. The inclining angle $\theta 1$, which changes in accordance with a radius of the idler or the sprocket around which the rubber crawler is wound, ranges from about 5° to about 30°, and the inclining angle $\theta 2$ is equal to or smaller than the inclining angle $\theta 1$ (generally, $\theta 2$ ranges from about 5° to 20°).

When the connecting members 10 are fitted with the wing portions 5 and 6, it is necessary to fit the connecting members 10 onto the wing portions 5 and 6 in a predetermined position. Accordingly, it is favorable to provide the wing portions 5 and 6 with steps that will facilitate assembly. For this reason, as shown in the example of the core metal 2 in FIG. 19, a ring-shaped convex step 12 may be formed at each of the wing portions 5 and 6.

Figure 19:
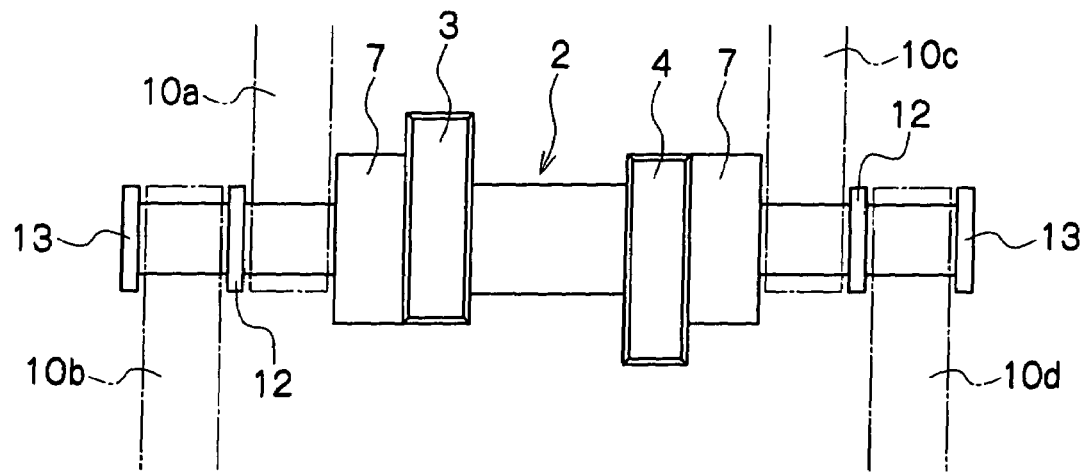
FIG. 19 is an inner circumferential side plan view showing yet another example of a rubber crawler.
Figure 20:
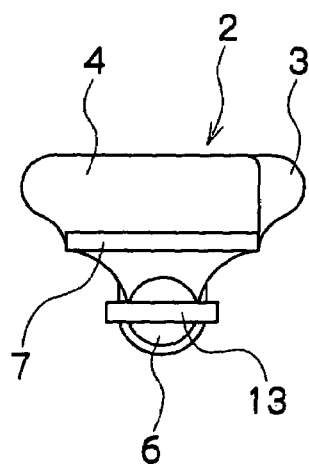
FIG. 20 is a side view of FIG. 19.
Figure 21:
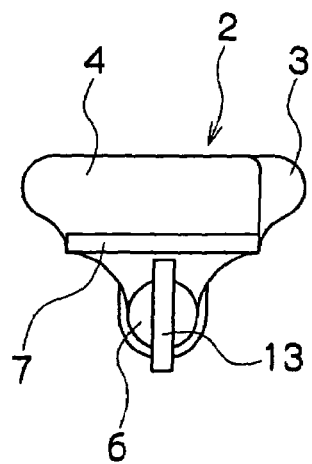
FIG. 21 is yet another side view of FIG. 20.
Figure 22A:
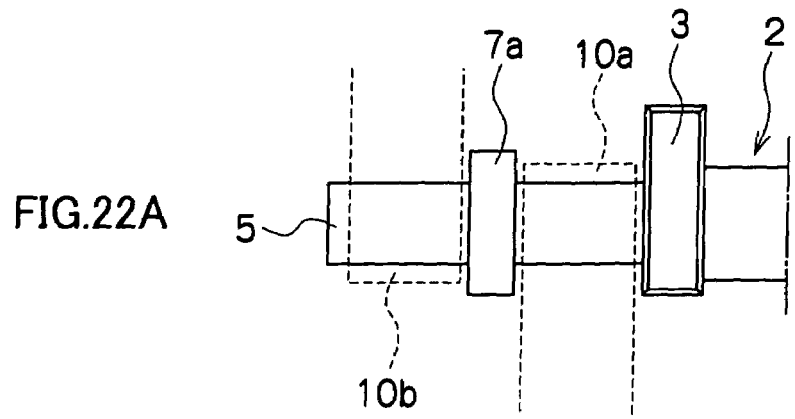
FIGS. 22A through 22D are inner circumferential side plan views of other examples of core metals.
Figure 22B:
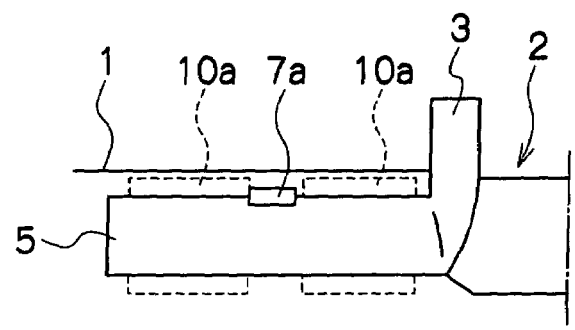
Figure 22C:
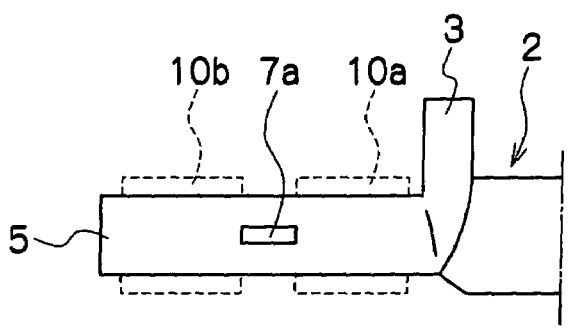
Figure 22D:
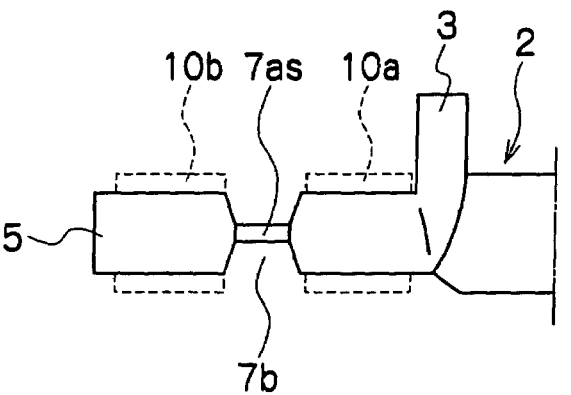
Figure 23:
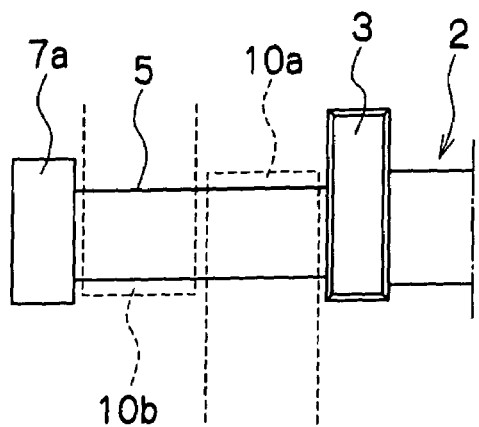
FIG. 23 is an inner circumferential side plan view of yet another example of a core metal.

It is necessary that the fitting of the connecting members 10 onto the wing portions 5 and 6 of the core metal 2 must be reliably maintained during assembly, after being embedded in the rubber elastomer 1, and during practical use for running. For this reason, as shown in FIG. 19, it is preferable that protruding portions 13 are formed at the respective tip end portions of the wing portions 5 and 6. FIG. 20 is another example of the core metal 2 in which the protruding portion 13 is formed to extend in a longitudinal direction of the rubber elastomer, and FIG. 21 is yet another example of the core metal 2 in which the protruding portion 13 is formed to extend in a thickness direction of the rubber elastomer.

As described above, each of the wing portions 5 and 6 of the core metal 2 is formed into a substantially circular cross-sectional configuration that can easily rotate in the rubber elastomer 1. Therefore, in some cases, it is necessary to form expanded portions respectively at the wing portions 5 and 6, and then embed them into the rubber elastomer 1 to thereby suppress rotations of the wing portions 5 and 6. As an example of such, description has been made with respect to FIG. 3 of the expanded portions (flat portions) 7 serving as rails on which wheels travel. However, the structure of the expanded portions is not limited to this, and instead, as shown in FIGS. 22A through 22D and FIG. 23, an expanded portion (ordinarily, flat portion) 7a may be formed at the center of each of the wing portions 5 and 6 or at the tip end thereof so as to extend in a longitudinal direction of the rubber elastomer 1, and be entirely or partially embedded in the rubber elastomer 1 thus making it possible to prevent the drawback that the wing portions 5 and 6 are rotated within the rubber elastomer 1. Further, the expanded portion 7a can be formed at an arbitrary position at each of the wing portions 5 and 6. For example, the expanded portion 7a can be protruded into each of the wing portions 5 and 6. An expanded portion 7 as can be formed at the center, in the transverse direction, of the wing portions 5 and 6, optionally having a neck portion 7b at the center, in the vertical direction, of the wing portions 5 and 6. Of course, an expanded portion formed at the tip end portion of each wing portion is also acceptable. Recesses or holes can be formed on the expanded portion (flat portion) 7a or 7 as in order to provide the rubber elastomer 1 with an anchor function.

Figure 24:
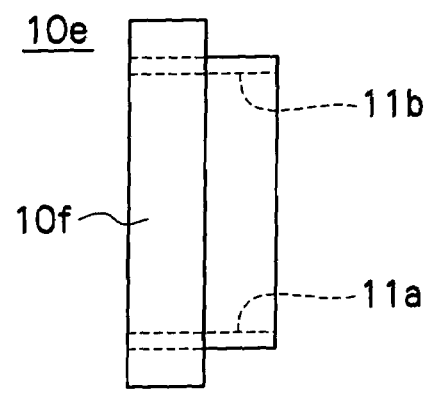
FIG. 24 is a plan view of a sixth example of a connecting member.
Figure 25:
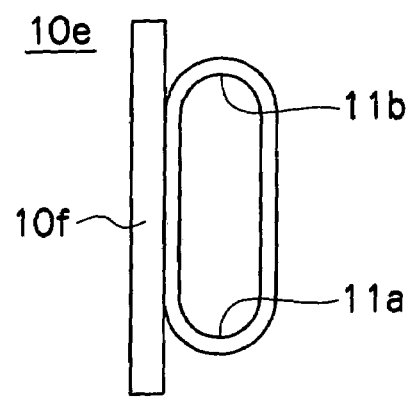
FIG. 25 is a side view of the connecting member of FIG. 24.

FIG. 24 is a plan view of an improved example of the connecting member 10, and FIG. 25 is a side view thereof. In the example, a flat surface 10f is provided at one end of a connecting member 10e so as to protrude therefrom. The flat portion 10f can be used as the aforementioned expanding member or it can be used unchanged as a rail portion on which wheels can travel.

Figure 26:
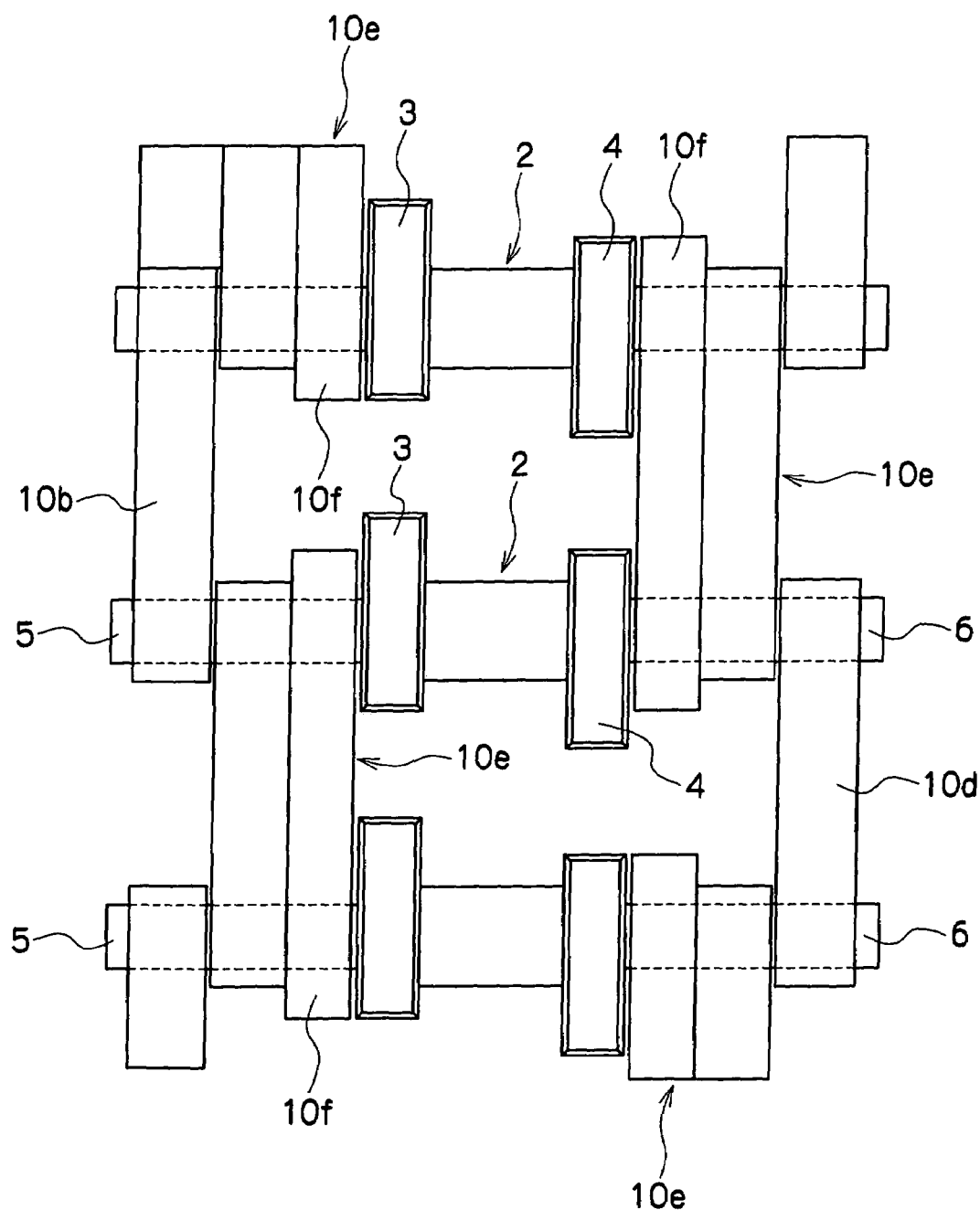
FIG. 26 is a plan view of a relationship between core metals and the connecting members shown in FIGS. 24 and 25.

FIG. 26 is a plan view of a combination of the connecting members 10e and the core metals 2. Here, instead of the connecting members 10a and 10c, the connecting members 10e having the flat portions 10f are disposed. As can be seen from this figure, since the flat portions 10f are used as rails on which wheels travel, the running road surface can be kept as long as possible, and reduction of vibrations can be ensured. In this structure, needless to say, there are many advantages in that the formation of rail portions on the core metals 2 themselves becomes unnecessary, the configuration of the core metals 2 can be simplified, the core metals 2 can be manufactured inexpensively, the core metals 2 can be made compact, and the core metals 2 can be handled more easily.

Figure 27:
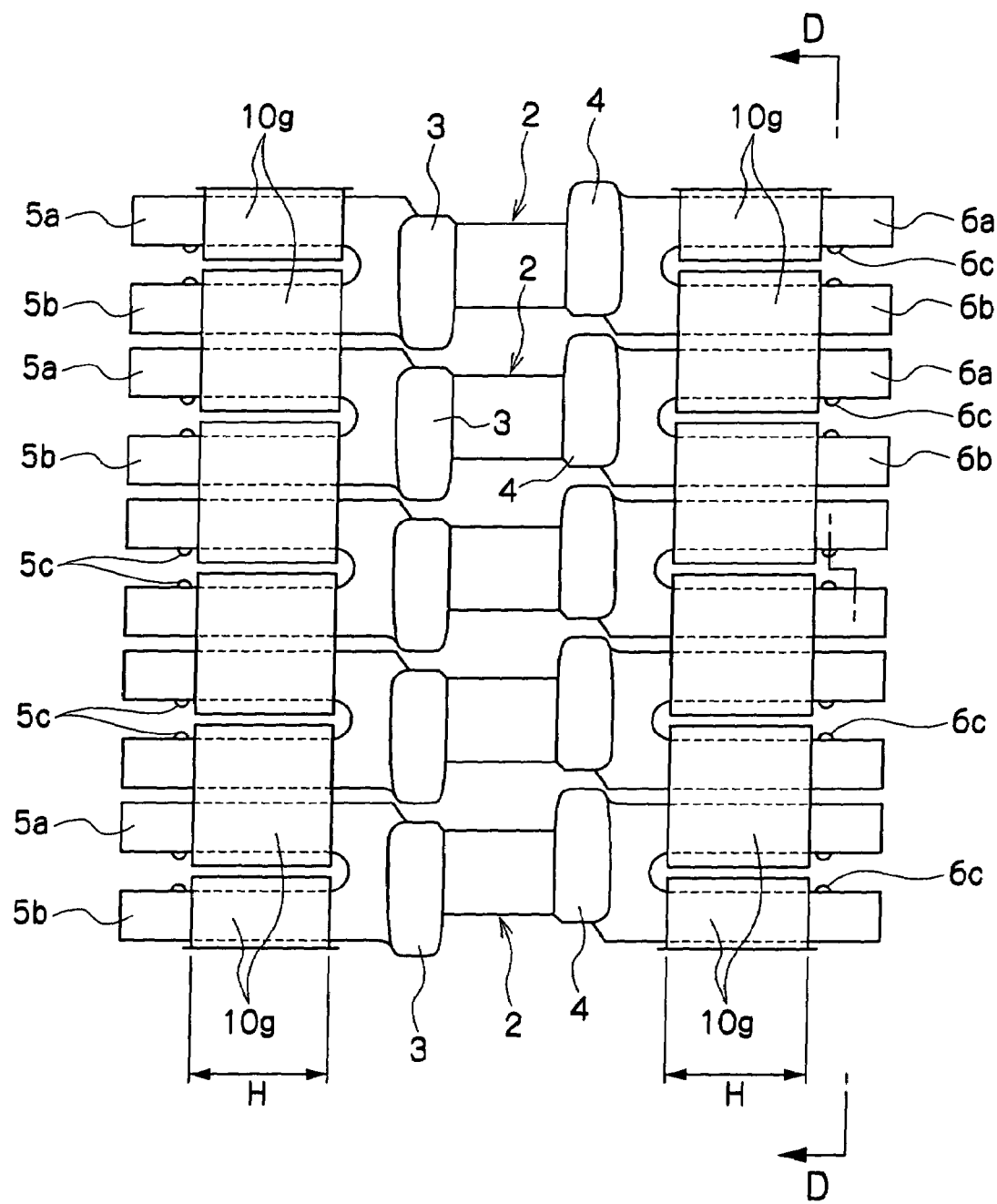
FIG. 27 is a plan view of a relationship between the connecting member and core metals having two-forked wing portions.
Figure 28:
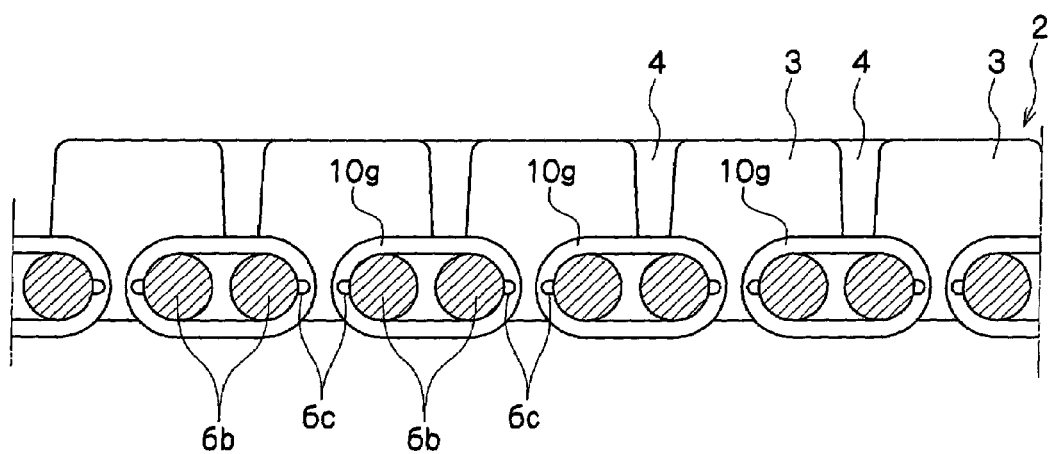
FIG. 28 is a cross-sectional view taken along line D-D of FIG. 27.

FIG. 27 is a plan view of an inner circumferential side of the rubber crawler 1 in which two-forked wing portions (5a and 5b, 6a and 6b) are formed, showing only the core metals 2 and connecting members 10g. FIG. 28 is a cross-sectional view taken along line D-D of FIG. 27.

In these figures, the wing portions 5a and 5b, and 6a and 6b are provided on either side of the rubber elastomer 1, and are embedded therein. Endless and flat-shaped connecting members 10g are sequentially fitted onto the wing portions (5a and 5b, and 6a and 6b). Accordingly, the core metals 2 and the connecting members 10g are continuously, i.e., endlessly arranged in the top-bottom direction of the paper surface of the drawing, and are embedded in the rubber elastomer 1 (not shown) in a state in which the connecting members 10g are fitted onto the wing portions (5a and 5b, and 6a and 6b).

The wing portions (5a and 5b, 6a and 6b), each of which is formed into a substantially circular sectional configuration which is slightly smaller than the semi-circular sectional configuration of each of the fitting surfaces (11a and 11b) of the connecting members 10g, are fitted into the connecting members 10g, whereby a smooth rotation of the rubber crawler is enabled. The smooth rotation can provide characteristics of reducing resistance to winding exhibited by the rubber crawler when the rubber crawler is wound around an idler or a sprocket.

Although the wing portions (5a and 5b, 6a and 6b) themselves have a circular cross-sectional configuration, they are embedded in a double line rubber elastomer. This is essentially similar to a case in which a wing portion has a large width, and vibrating rotation of the core metals 2 can thus be reduced to a great extent. Further, protruding portions 5c and 6c are formed at the wing portions (5a and 5b, 6a and 6b) in order to position and the connecting members 10g in place and keep them aligned. Of course, these protruding portions 5c and 6c can be applied to various types of wing portions.

Figure 29:
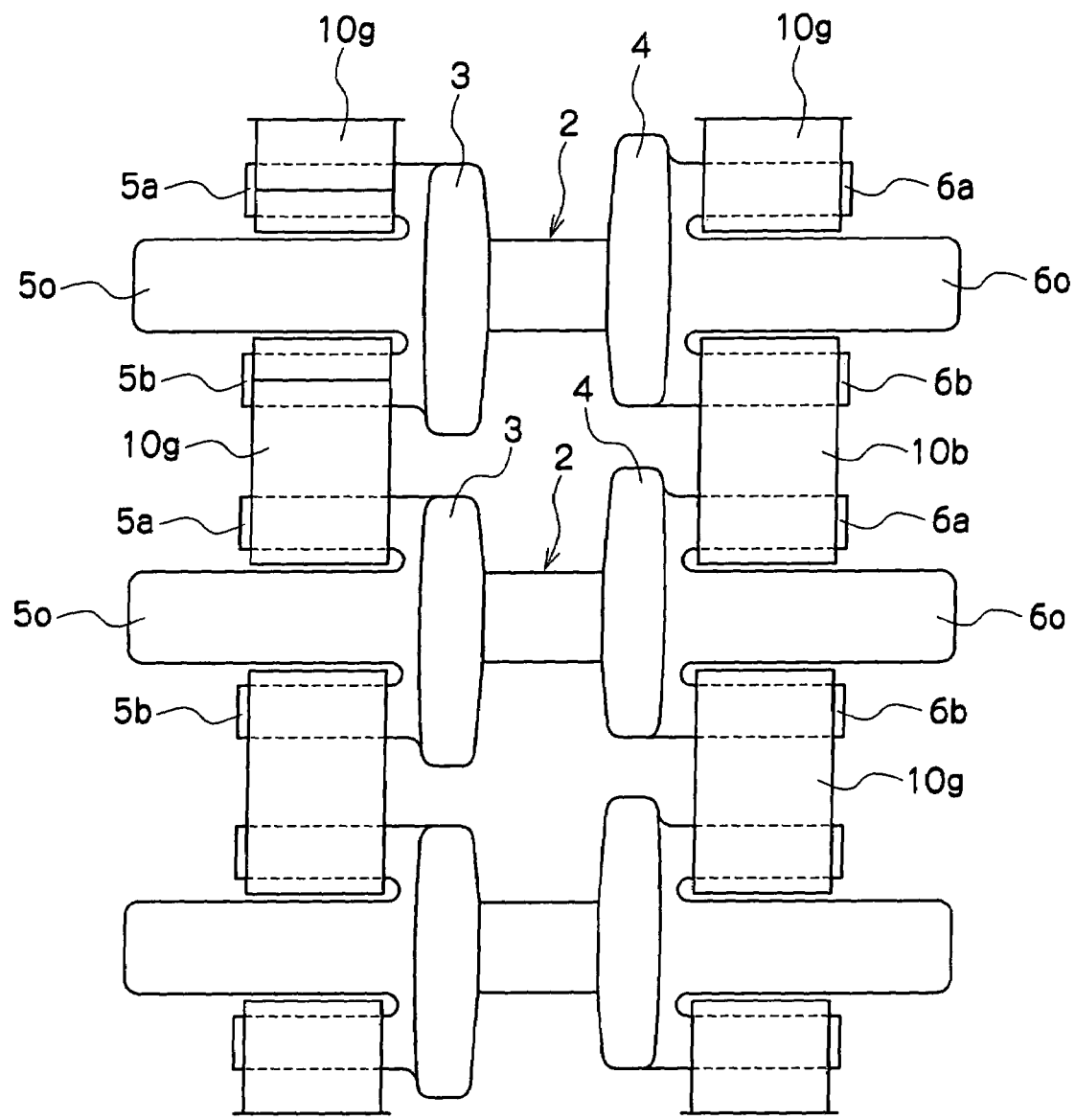
FIG. 29 is a plan view of a relationship between the connecting member and core metals having three-forked wing portions.

FIG. 29 is a plan view of an example of an inner circumferential side of the rubber crawler 1 in which a three-forked wing portion is formed. In this case, a third wing portion 50 is formed between the wing portions 5a and 5b and a third wing portion 60 is formed between the wing portions 6a and 6b. In addition, each of the third portions 50 and 60 is formed into a flat cross-sectional configuration and also is long in a transverse direction. The entire wing portion (5a and 5b and 50 or 6a and 6b and 60) can exhibit almost the same effect as a wing portion having a flat portion as wide as the wing portions 5a and 5b plus the third wing portion 50 would, whereby vibrating rotation of the core metal 2 can further be reduced.

Figure 30:
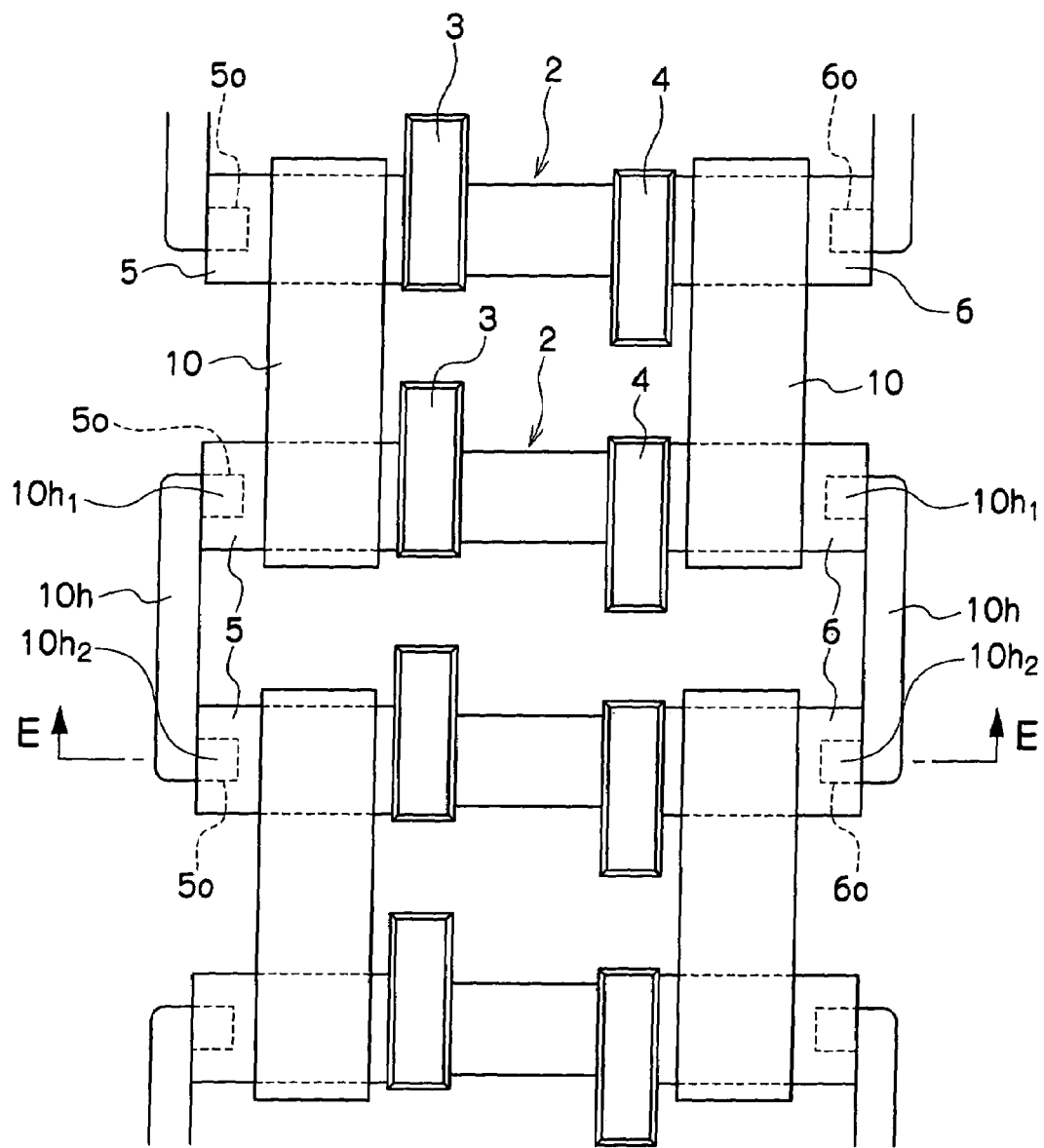
FIG. 30 is a plan view of a relationship between core metals and second connecting members used as the connecting members.
Figure 31:
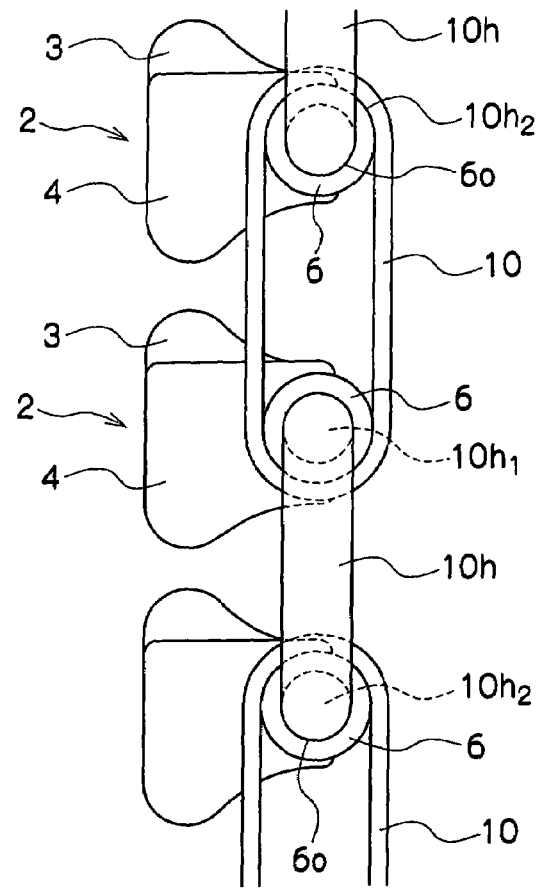
FIG. 31 is a side view of FIG. 30.
Figure 32:
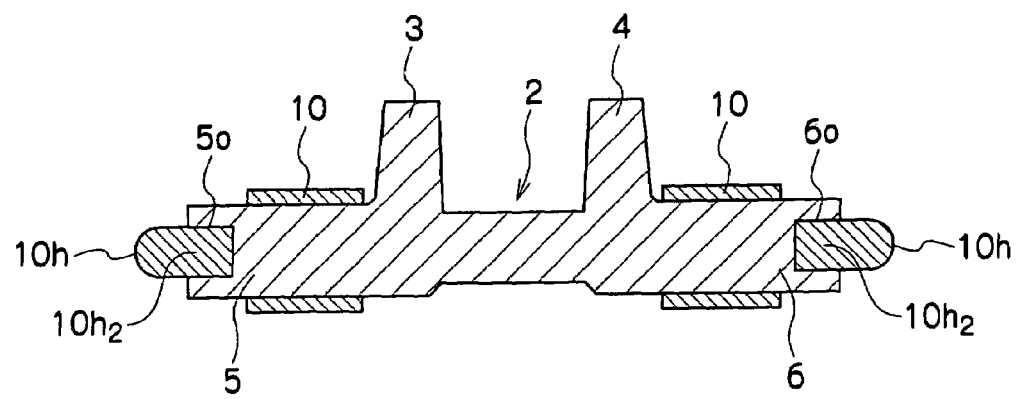
FIG. 32 is a cross-sectional view taken along line E-E of FIG. 30.

FIG. 30 is a plan view of an inner circumferential side of a rubber crawler in which core metals are connected to one another by using a second connecting member 10h whose structure is different from those in the above-description, FIG. 31 is a side view thereof, and FIG. 32 is a cross sectional view taken along line E-E.

The above-described endless and flat connecting members 10 are shown. Substantially semicircular fitting portions are formed at both ends of the connecting member 10. A pair of the fitting portions are fitted onto the corresponding wing portions 5 and 6 of two core metals, as shown in FIG. 30. On the other hand, the second connecting member 10h is formed into a longitudinal U-shape, and each of bent portions $10h_1$ and $10h_2$ at both sides of the second connecting member 10h is formed into a cylindrical shape. The bent portions $10h_1$ and $10h_2$ at both sides of the second connecting member 10h are fitted into the corresponding holes 50 and 60 formed at the tip end portions of the wing portions 5 and 6 of the core metals 2, whereby the entire core metals 2 can be connected to one another. As described above, the rubber crawler of the present invention is formed by embedding the core metals 2 and the connecting members 10 and 10h in the rubber crawler (not shown). Further, these two types of the connecting members can be fitted onto the wing portions in a symmetric form or in a staggered form.

In a structure in which sets of two different types of connecting members are fitted onto both left-hand side and right-hand side portions of the wing portions, there may be a case in which not all of the wing portions are long enough for such an arrangement, that is, some of the wing portions may not be long enough to accommodate two connecting members therein. Further, in the rubber crawler using a conventional tensile reinforcing member, the rubber crawler may be distorted upon a receipt of external force and/or edge breakage may occur upon a receipt of shearing force, whereby durability is deteriorated.

In view of the aforementioned problem, the core metals 2 can be sequentially connected to one another by using the first connecting members 10 for connecting wing portions themselves and the second connecting members 10h for connecting only tip end portions of the wing portions. Accordingly, when the length of a wing portion is insufficient, a connecting member with sufficient strength can be fitted onto the wing portion. Since the second connecting member 10h can be fitted onto the wing portion from the transverse direction thereof, the connection can be simplified. More specifically, since the second connecting member 10h and the tip end portions of the wing portions 5 and 6 are fitted to each other, portions with high rigidity can be formed in the vicinities of both edge ends of the rubber crawler. Consequently, the occurrence of edge breakage can be reduced. Moreover, the second connecting members 10h also prevent the first connecting members from being removed from either end of the wing portions, with aligning the wing portions.

Figure 33:
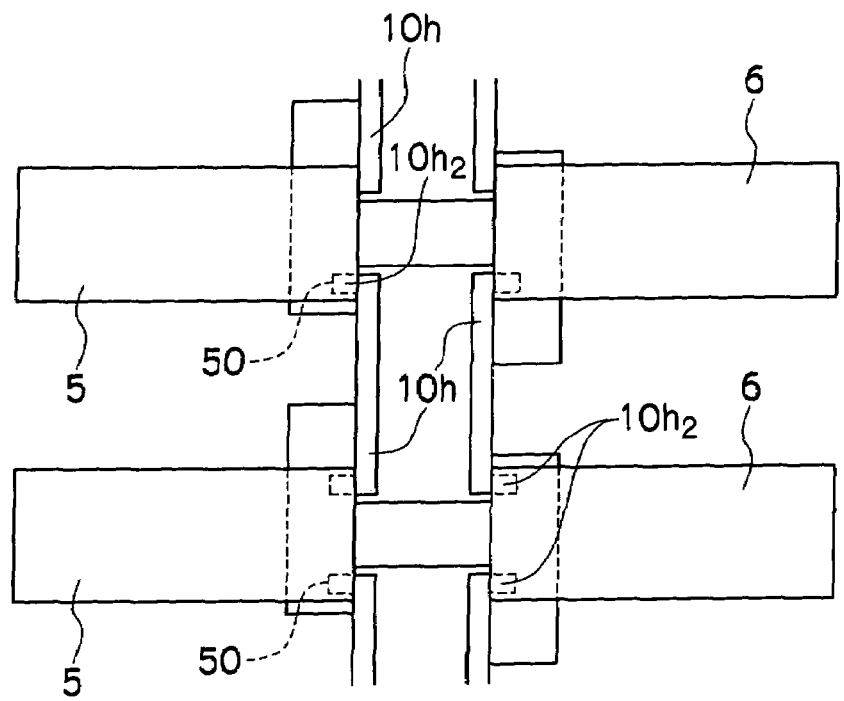
FIG. 33 is a partial view of a relationship between the second connecting members as the connecting members and core metals according to another example.

The second connecting member 10h is inserted into a pair of holes which are formed at outermost tip end portions of each wing portion. However, depending on the applications, the second connecting member 10h can be inserted into a pair of holes which are formed at innermost tip end portions of each wing portion, as shown in FIG. 33. When the second connecting member 10h is thus employed for the outermost ends or the innermost ends of the wing portion, there is a case in which the connecting member 10 is rendered unnecessary.

Furthermore, each bent portions $10h_1$ and $10h_2$ can be sequentially inserted into two holes or two elongated holes that are formed at both tip end portions or both inner ends of the wing portions. Accordingly, this provides the present invention with new characteristics in that the rubber crawler can be constituted without using the first connecting member 10.

Figure 34:
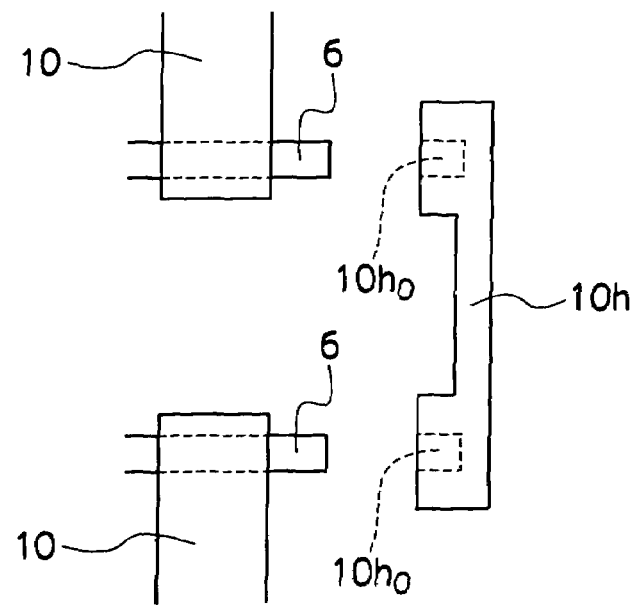
FIG. 34 is a partial view of a relationship between the second connecting members as the connecting members and core metals according to yet another example.

FIG. 34 shows another example of the fitting structure between the second connecting member 10h and the wing portion 6 in which a hole portion $10h_0$ formed on the second connecting member 10h can be fitted onto the wing portion 6.

Figure 35:
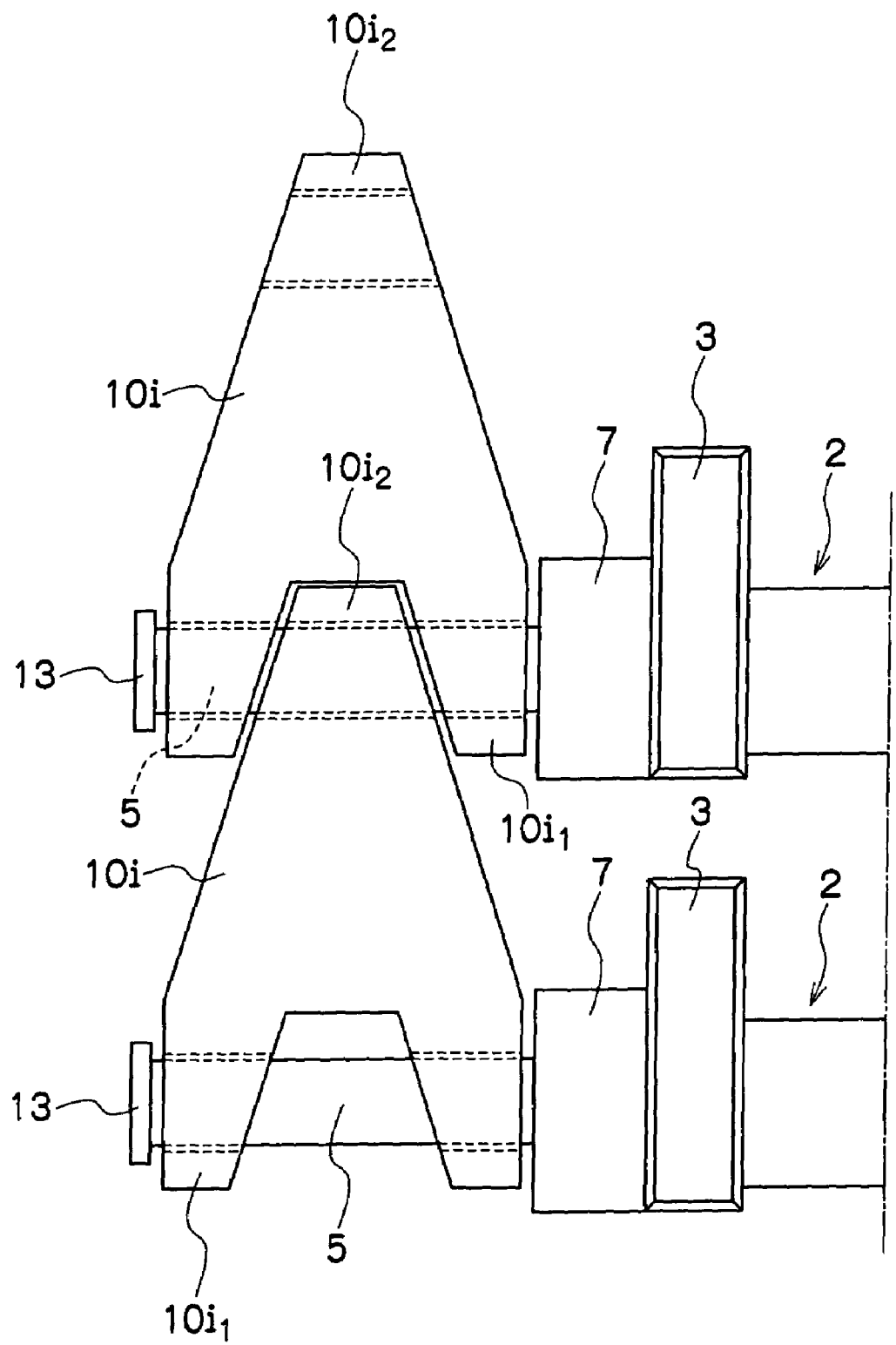
FIG. 35 is a plan view of still another example of a relationship between wing portions of core metals, and connecting members.

FIG. 35 shows yet another example of a connecting member 10i in which one end portion of an engaging portion $10i_1$ is two-forked, and one end portion of another engaging portion $10i_2$ is disposed inside the two-forked end portion of the engaging portion $10i_1$ in a nesting state. Engaging portion 11c or 11d can be formed into any of the configurations of the examples described above.

EFFECTS OF THE INVENTION

Since the present invention is structured as described above, an excellent rubber crawler can be obtained in which the embedding of steel cords for a tensile reinforcement is rendered unnecessary, strength of a tensile reinforcing member is increased, and torsion of core metals can be reduced.

What is claimed is:

1. A rubber crawler comprising:
   an endless rubber elastomer;
   core metals including protruding portions protruding from an inner circumference of the rubber elastomer and pairs of left-hand side and right-hand side wing portions embedded in the rubber elastomer; and
   lugs formed at an outer circumference side of the rubber elastomer,
   wherein two connecting members are fitted onto each of the left-hand side and right-hand side wing portions of each core metal in the longitudinal direction of the rubber elastomer, such that the adjacent core metals are sequentially connected with each other; and
   wherein the connecting members are arranged in a staggered form in the longitudinal direction of the rubber elastomer.

2. The rubber crawler of claim 1,
   wherein rails on which wheels travel are provided at outer sides of the protruding portions of the core metals in a transverse direction of the rubber crawler, and the wing portions onto which the connecting members are fitted are formed outside of the rails in the transverse direction.

3. The rubber crawler of claim 1,
   wherein a portion of the wing portions onto which the connecting members are fitted is formed with a substantially circular cross-sectional configuration.

4. The rubber crawler of claim 1,
   wherein a tip end portion of the wing portions is a protruding portion which is formed with a cross-sectional configuration different from that of the portion of the wing portions onto which the connecting members are fitted.

5. The rubber crawler of claim 4,
   wherein a protruding portion extending in the longitudinal direction of the rubber elastomer is formed at the tip end portion of the wing portions.

6. The rubber crawler of claim 4,
   wherein a protruding portion extending in the thickness direction of the rubber elastomer is formed at the tip end portion of the wing portions.

7. The rubber crawler of claim 1,
   wherein engaging portions, each having a substantially circular inner circumferential surface, are formed at both ends of the connecting members.

8. The rubber crawler of claim 1,
   wherein a flat portion is provided at one side of the connecting members, and is exposed at an inner circumferential surface of the rubber elastomer to form a rail on which wheels travel.

9. The rubber crawler of claim 1,
   wherein, as seen from a side view, a straight portion is formed at an inner circumferential side of the connecting members, an intermediate portion of the connecting members at an outer circumferential side thereof is recessed toward the inner circumference thereof, and engaging portions, each having a substantially circular inner surface, are formed at both ends of the connecting members.

10. The rubber crawler of claim 1, further comprising lugs for substantially covering the connecting members at outer most sides in a transverse direction of the rubber elastomer.

11. The rubber crawler of claim 1,
    wherein sets of the connecting members fitted onto the left-hand side and right-hand side wing portions of the core metals are arranged symmetrically in a transverse direction of the rubber elastomer.

12. The rubber crawler of claim 1,
    wherein sets of the connecting members fitted onto the left-hand side and right-hand side wing portions of the core metals are arranged asymmetrically in a transverse direction of the rubber elastomer.

13. The rubber crawler of claim 1, wherein the cross section of the wing portions at a side in contact with the connecting members is formed into a substantially circular-shaped configuration, and the cross section of the wing portions at another side not in contact with the connecting members is formed into an trapezoidal configuration.

14. The rubber crawler of claim 13, wherein an inclination angle θ of an inclining surface of the trapezoidal section ranges from 5° to 30°.

15. The rubber crawler of claim 1, wherein expanded portions are formed at both outer sides of the protruding portions of each core metal in a transverse direction of the rubber crawler, and the wing portions, the connecting members and the expanded portions are embedded in the rubber elastomer, or embedded with portions being exposed.

16. The rubber crawler of claim 15, wherein the expanded portions are provided in the vicinities of left-hand side and right-hand side outer sides of the protruding portions of the core metals.

17. The rubber crawler of claim 15, wherein the expanded portions are provided at the midpoints of the wing portions.

18. The rubber crawler of claim 15, wherein the expanded portions are provided at tip ends of the wing portions.

* * * * *